Patented Feb. 10, 1942

2,272,866

UNITED STATES PATENT OFFICE 2,272,866

PROCESS OF MANUFACTURING ASPHALTS

Robert E. Burk and Charles H. Whitacre, Cleveland, Ohio, assignors to The Standard Oil Company, Cleveland, Ohio, a corporation of Ohio No Drawing. Application July 15, 1938, Serial No. 219,405

5 Claims. (Cl. 196—74)

In the production of asphalt it is customary to blow petroleum residuum with air, the temperature being maintained at about 300–500° F. Very long continued treatment on this order is required for the attainment of products having suitably high melting point and low penetration. We have found that asphalt-making can be greatly accelerated by suitable treatment with a small amount of a halide acting catalytically, and particularly advantageously with the presence of a small amount of a hydrohalogen acid.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The raw material, heavy hydrocarbon material containing aliphatic hydrocarbons, usually a heavy petroleum oil from which distillable hydrocarbons have been removed, and which in general is designated as residuum, is in accordance with the invention heated and agitated in the presence of a small or catalytic amount of a halide catalyst as capable of effecting the Friedel-Crafts reaction, or such as a halide of zirconium, aluminum, tantalum, copper, tin, zinc, antimony, arsenic, iron, titanium, boron, etc., boron fluoride ($BF_3$), or especially aluminum chloride ($AlCl_3$), being particularly inexpensive and desirable. The temperature may be for instance 225–450° F. And as hydro-halogen acid we provide a small amount for instance of hydrogen chloride (HCl), hydrogen bromide (HBr), hydrogen fluoride (HF), hydrogen iodide (HI), such that the treatment of the residuum in the presence of the halide catalyst is carried out in the presence of the hydro-halogen acid in small or catalytic amount also, in general the number of mols of halogen acid not exceeding the number of mols of the halogen catalyst. While the reason for the action is not entirely clear, it may be that the halide acts as a polymerizing catalyst and the hydro-halogen as a promoter. The hydro-halogen acid or promoter may be incorporated at the same time as the halide catalyst or it may be incorporated in the residuum before of after introducing the halide, as may be desired in any instance, so that the two agents are suitably present for action together. For instance, the residuum may be agitated and the catalyst and the promoter as for example 0.10 to 1.0 per cent of $AlCl_3$, advantageously 0.25 per cent, and 0.1 to 1.0 per cent of HCl, may be supplied, the temperature being maintained in the desired range, as for instance 225 to 450° F. Depending upon the precise specifications of product desired, such treatment may be applied for a sufficient time, as controlled by sampling. Usually ½ to 3 hours is sufficient. In some cases it is advantageous to apply the catalytic treatment to residuum which is already oxidized or has been subjected to air-blowing. Thus, for instance a residuum may be heated and agitated in exposure to oxygen or be air-blown to partial conversion to desired specifications, for example being air-blown for 12 to 24 hours at a temperature of 400 to 550° F. Then, the catalyst and promoter may be introduced, and without further supplying oxygen, the residuum may be suitably agitated in the presence of the catalyst and promoter. In cases where desired, the air-blowing may be continued after the introduction of the catalyst and promoter. The time of the catalytic treatment of material which has been first subjected to oxidation action will depend somewhat upon the specification characteristics of the finished product desired. In general, it may be 15 to 60 minutes. The divisional processes respectively of air blowing followed by treating with an acid-acting catalyst, and air blowing with a catalyst followed by treating with aluminum halide are set forth in our co-pending applications Ser. No. 112,348, filed Nov. 23, 1936, now Patent No. 2,179,208, dated November 7, 1939, and Ser. No. 219,186, filed July 14, 1938, now Patent No. 2,200,914, dated May 14, 1940.

Other modes of applying the principle of the invention may be employed, change being made as regards the details described, provided the features stated in any of the following claims, or the equivalent of such, be employed.

We therefore particularly point out and distinctly claim as our invention:

1. In a process of making asphalt, heating and agitating residuum in exposure to oxygen, to partial conversion to desired specifications, then without further supplying oxygen incorporating in the residuum a small amount of zirconium halide and a small amount of a hydro-halogen acid.

2. In a process of making asphalt, heating and agitating residuum in exposure to oxygen, to partial conversion to desired specifications, then without further supplying oxygen incorporating in the residuum a small amount of aluminum halide and a small amount of a hydro-halogen acid.

3. In a process of making asphalt, heating and agitating residuum in exposure to oxygen, to partial conversion to desired specifications, then without further supplying oxygen incorporating in the residuum a small amount of a halide catalyst and a small amount of a hydro-halogen acid for completion of the action at conversion temperature.

4. In a process of making asphalt, heating and agitating petroleum residuum to asphalt consistency with from 0.10% to 1.0% of a metal halide catalyst and from 0.10% to 1.0% of a hydro-halogen acid promoter at a temperature of from 225° F. to 450° F. for a time period of from ½ to 3 hours.

5. In a process of making asphalt, heating and agitating petroleum residuum to asphalt consistency in the presence of oxygen, from 0.10% to 1.0% of a metal halide catalyst, and from 0.10% to 1.0% of a hydro-halogen acid promoter.

ROBERT E. BURK.
CHARLES H. WHITACRE.